United States Patent
Koga

(10) Patent No.: US 11,005,104 B2
(45) Date of Patent: May 11, 2021

(54) BATTERY

(71) Applicant: Panasonic Intellectual Property Management Co., Ltd., Osaka (JP)

(72) Inventor: Eiichi Koga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 135 days.

(21) Appl. No.: 16/387,609

(22) Filed: Apr. 18, 2019

(65) Prior Publication Data
US 2019/0363368 A1 Nov. 28, 2019

(30) Foreign Application Priority Data
May 28, 2018 (JP) .............................. JP2018-101611

(51) Int. Cl.
*H01M 4/58* (2010.01)
*H01M 4/66* (2006.01)
*H01M 10/0562* (2010.01)
*H01M 10/0585* (2010.01)

(52) U.S. Cl.
CPC .......... *H01M 4/667* (2013.01); *H01M 4/661* (2013.01); *H01M 10/0562* (2013.01); *H01M 10/0585* (2013.01); *H01M 2300/0068* (2013.01)

(58) Field of Classification Search
CPC .... H01M 4/136; H01M 4/5815; H01M 4/661; H01M 4/667; H01M 10/0562; H01M 10/0585; H01M 2300/0068; Y02E 60/10
See application file for complete search history.

(56) References Cited

U.S. PATENT DOCUMENTS

| 2014/0193693 | A1* | 7/2014 | Hoshina | H01B 1/10 429/149 |
| 2015/0357674 | A1 | 12/2015 | Haga et al. | |
| 2016/0197351 | A1* | 7/2016 | Tani | H01M 4/667 429/162 |
| 2020/0076002 | A1* | 3/2020 | Okamoto | H01M 10/0565 |

FOREIGN PATENT DOCUMENTS

| JP | 2009-032597 | 2/2009 |
| JP | 2014-137868 | 7/2014 |
| JP | 2016-173915 | 9/2016 |
| WO | 2014/156638 | 10/2014 |
| WO | WO 2018-110688 | * 6/2018 |

* cited by examiner

*Primary Examiner* — Brittany L Raymond
(74) *Attorney, Agent, or Firm* — Greenblum & Bernstein, P.L.C.

(57) ABSTRACT

A battery includes a unit cell including an electrode layer and a counter electrode layer; a first current collector disposed on a side of the electrode layer opposite to the counter electrode layer and electrically connected to the electrode layer; a first solid electrolyte layer disposed in contact with a lateral side of the unit cell; and a first copper sulfide layer containing copper sulfide. The first current collector contains copper. The first copper sulfide layer is disposed between the first current collector and the first solid electrolyte layer and in contact with the first current collector and the first solid electrolyte layer.

10 Claims, 5 Drawing Sheets

BATTERY

BACKGROUND

1. Technical Field

The present disclosure relates to batteries.

2. Description of the Related Art

For example, International Publication No. WO 2014/156638 discloses solid-state batteries which have a copper sulfide layer on a current collector substrate including copper or copper alloy to protect the current collector from sulfur corrosion by a negative electrode active material layer.

SUMMARY

In one general aspect, the techniques disclosed here feature a battery including a unit cell including an electrode layer and a counter electrode layer facing the electrode layer; a first current collector disposed on a side of the electrode layer opposite to the counter electrode layer and electrically connected to the electrode layer; a first solid electrolyte layer disposed in contact with a lateral side of the unit cell; and a first copper sulfide layer containing copper sulfide. The first current collector contains copper. The first copper sulfide layer is disposed between the first current collector and the first solid electrolyte layer and in contact with the first current collector and the first solid electrolyte layer.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Summary of Disclosure

Figure 1:
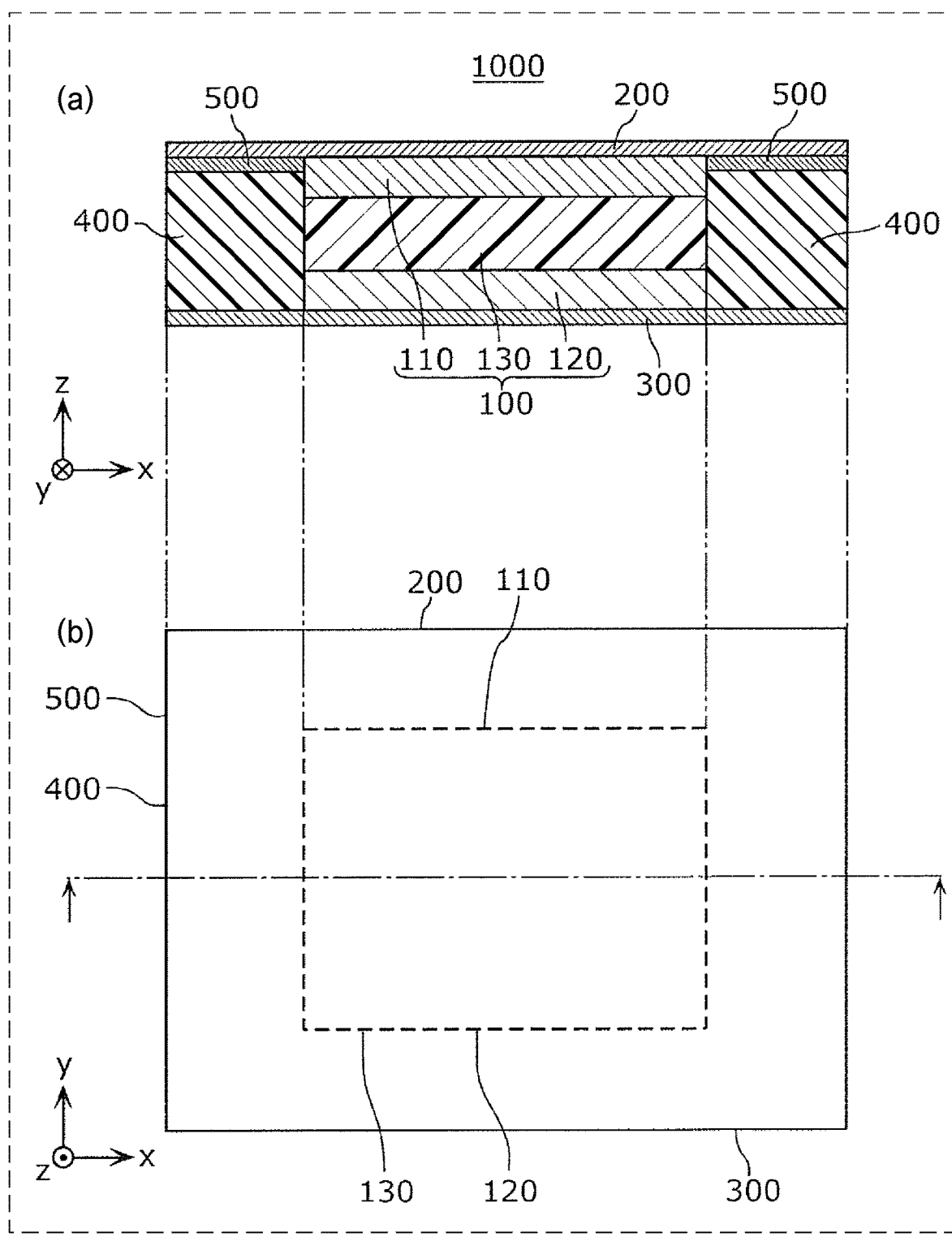
FIG. 1 is a view illustrating a schematic configuration of a battery of Embodiment 1.

A battery according to one aspect of the present disclosure includes a unit cell including an electrode layer and a counter electrode layer facing the electrode layer; a first current collector disposed on a side of the electrode layer opposite to the counter electrode layer and electrically connected to the electrode layer; a first solid electrolyte layer disposed in contact with a lateral side of the unit cell; and a first copper sulfide layer containing copper sulfide. The first current collector contains copper. The first copper sulfide layer is disposed between the first current collector and the first solid electrolyte layer and in contact with the first current collector and the first solid electrolyte layer. The counter electrode layer may be configured to function as a counter electrode of the electrode layer.

The above battery attains excellent impact resistance and high structural stability. Specifically, the first copper sulfide layer serves to strongly and closely bond the first current collector and the first solid electrolyte layer to each other and thereby prevents an interlayer separation which occurs at the outer periphery of the battery and spreads towards the unit cell that is the power-generating element. For example, the battery exhibits superior impact resistance and high reliability with little occurrence of structural defects during the manufacturing process or actual use of the battery.

For example, the first solid electrolyte layer may contain sulfur.

In the above case, the adhesion between the first copper sulfide layer and the first solid electrolyte layer is increased, and consequently the first solid electrolyte layer and the first current collector may be bonded more strongly via the first copper sulfide layer. Thus, the structural stability of the battery may be enhanced.

For example, the first solid electrolyte layer may include a sintered structure.

In the above case, the first solid electrolyte layer attains higher strength, and the adhesion between the first copper sulfide layer and the first solid electrolyte layer is increased. Consequently, the first solid electrolyte layer and the first current collector may be bonded more strongly via the first copper sulfide layer.

For example, the unit cell may further include a second solid electrolyte layer between the electrode layer and the counter electrode layer, and the first solid electrolyte layer may be in contact with the second solid electrolyte layer.

In the above case, the first solid electrolyte layer can prevent collapse of the end portions of the second solid electrolyte layer, and the structural stability of the battery may be further enhanced. Further, part of the first solid electrolyte layer can contribute to ion conduction between the electrode layer and the counter electrode layer.

For example, the first solid electrolyte layer and the second solid electrolyte layer may include the same solid electrolyte material.

In the above case, the first solid electrolyte layer can prevent more reliably collapse of the end portions of the second solid electrolyte layer. Further, part of the first solid electrolyte layer can make a greater contribution to ion conduction between the electrode layer and the counter electrode layer.

For example, the battery according to one aspect of the present disclosure may further include a second copper sulfide layer containing copper sulfide, and the second copper sulfide layer may be disposed between the first current collector and the electrode layer and in contact with the first current collector and the electrode layer.

In the above case, the second copper sulfide layer serves to strongly and closely bond the electrode layer and the first current collector to each other and thereby offers higher structural stability of the battery.

For example, the electrode layer may contain sulfur.

In the above case, the adhesion between the second copper sulfide layer and the electrode layer is increased, and consequently the electrode layer and the first current collector may be bonded more strongly via the second copper sulfide layer.

For example, the thickness of the first copper sulfide layer may be larger than the thickness of the second copper sulfide layer.

In the above case, because the second copper sulfide layer is smaller in thickness than the first copper sulfide layer, less stress is concentrated by impact or thermal stress at the boundary between the region having the unit cell (the power-generating element) and the region having the first solid electrolyte layer. Consequently, the first copper sulfide layer and the second copper sulfide layer are less prone to disconnection from each other, and the battery attains higher structural stability.

For example, the battery according to one aspect of the present disclosure may further include a second current collector disposed on a side of the counter electrode layer opposite to the electrode layer and electrically connected to the counter electrode layer; and a third copper sulfide layer containing copper sulfide. The second current collector may contain copper. The third copper sulfide layer may be disposed between the second current collector and the first solid electrolyte layer and in contact with the second current collector and the first solid electrolyte layer.

In the above case, the third copper sulfide layer serves to strongly and closely bond the second current collector and the first solid electrolyte layer to each other and thereby prevents an interlayer separation which occurs at the outer periphery of the battery and spreads towards the unit cell that is a power-generating element. For example, the battery exhibits superior impact resistance and high reliability with little occurrence of structural defects during the manufacturing process or actual use of the battery.

For example, the battery according to one aspect of the present disclosure may further include a fourth copper sulfide layer containing copper sulfide. The fourth copper sulfide layer may be disposed between the second current collector and the counter electrode layer and in contact with the second current collector and the counter electrode layer.

In the above case, the fourth copper sulfide layer serves to strongly and closely bond the counter electrode layer and the second current collector to each other, and consequently the structural stability of the battery may be further enhanced.

For example, the counter electrode layer may contain sulfur.

In the above case, the adhesion between the fourth copper sulfide layer and the counter electrode layer is increased, and consequently the counter electrode layer and the second current collector may be bonded more strongly via the fourth copper sulfide layer.

For example, the thickness of the third copper sulfide layer may be larger than the thickness of the fourth copper sulfide layer.

In the above case, because the fourth copper sulfide layer is smaller in thickness than the third copper sulfide layer, less stress is concentrated by impact or thermal stress at the boundary between the region having the unit cell (the power-generating element) and the region having the first solid electrolyte layer. Consequently, the third copper sulfide layer and the fourth copper sulfide layer are less prone to disconnection from each other, and the battery attains higher structural stability.

Embodiments will be described hereinbelow with reference to the appended drawings.

The embodiments shown below illustrate comprehensive or specific examples. The configurations in the embodiments below such as values, shapes, materials, constituent elements, and the positions and manners of connection of the constituent elements are only illustrative and do not limit the scope of the present disclosure thereto. Of the constituent elements described in the embodiments below, those which are not described in independent claims are illustrated as optional constituent elements.

The drawings are schematic and are not necessarily strict. Thus, for example, scales may vary between drawings. In the drawings, substantially identical elements are assigned with the same numerals, and overlaps in the description of such elements will be omitted or simplified.

In the present specification, terms which indicate relationships between elements such as parallel, terms which indicate the shapes of elements such as rectangular, and numerical ranges are not strict, and are understood to comprehend substantial equivalents, for example, variations of about several percentages (%).

In the present specification, the terms "above" and "below" do not mean being in the upward direction (perpendicularly above) and being in the downward direction (perpendicularly below) in the absolute spatial recognition, but indicate relative positional relationships based on the order in which layers are stacked. Further, the terms "on" and "under" mean not only that two constituent elements are disposed with a spacing therebetween and another constituent element is present between the two constituent elements, but also that two constituent elements are disposed in close and direct contact with each other.

In the present specification and drawings, the x axis, the y axis and the z axis indicate the three axes in a three-dimensional orthogonal coordinate. In the embodiments, the z axis direction is the thickness direction of a battery. In the present specification, the term "thickness direction" is the direction that is perpendicular to the surface of an electrode current collector on which an electrode layer is disposed, or the surface of a counter electrode current collector on which a counter electrode layer is disposed. In the present specification, the phrase "in plan view (or simply "plan")" means that a battery is viewed along the thickness direction of the battery.

Embodiment 1

FIG. 1 is a view illustrating a schematic configuration of a battery 1000 according to Embodiment 1. Specifically, FIG. 1(*a*) is a sectional view of the battery 1000, and illustrates the cross section along the dot-and-dash line in FIG. 1(*b*). FIG. 1(*b*) is a top perspective view of the battery 1000. In FIG. 1(*b*), the plan shapes of constituent elements of the battery 1000 seen from above are shown with actual lines or broken lines.

As illustrated in FIG. 1, the battery 1000 of Embodiment 1 includes a power-generating element 100, a first current collector 200, a second current collector 300, a first solid electrolyte layer 400 and a first copper sulfide layer 500.

The power-generating element 100 is, for example, a power-generating section (or a power storage section) having charging and discharging functions. For example, the power-generating element 100 is a secondary battery. The power-generating element 100 is disposed between the first current collector 200 and the second current collector 300.

As illustrated in FIG. 1(*a*), the power-generating element 100 includes an electrode layer 110 and a counter electrode layer 120. The power-generating element 100 further includes a second solid electrolyte layer 130 disposed between the electrode layer 110 and the counter electrode layer 120. The electrode layer 110, the second solid electrolyte layer 130 and the counter electrode layer 120 are stacked in this order in the thickness direction (the z axis direction) of the battery 1000. The power-generating element 100 is, for example, a solid-state battery.

In the power-generating element 100 of Embodiment 1, the electrode layer 110 is a positive electrode, and the counter electrode layer 120 is a negative electrode of the battery. In this case, the first current collector 200 is a positive electrode current collector, and the second current collector 300 is a negative electrode current collector.

The electrode layer 110 is a first active material layer including a first active material as an electrode material. The electrode layer 110 is disposed in contact with the first current collector 200.

In Embodiment 1, the first active material contained in the electrode layer 110 is a positive electrode active material (a positive electrode material). For example, the positive electrode active material may be any of various materials capable of storing and releasing metal ions such as Li ions or Mg ions. Known positive electrode active materials may be used. For example, a transition metal oxide containing lithium ions may be used as the positive electrode active material. Specifically, for example, lithium nickel composite oxide ($LiNi_xM_{1-x}O_2$) may be used as the transition metal oxide. Here, M is at least one element of Co, Al, Mn, V, Cr, Mg, Ca, Ti, Zr, Nb, Mo and W. The letter x is a number of not less than 0 and not more than 1. Alternatively, the transition metal oxide may be a layered oxide such as lithium cobalt oxide ($LiCoO_2$), lithium nickel oxide ($LiNiO_2$) or lithium manganese oxide ($LiMn_2O_4$), olivine lithium iron phosphate ($LiFePO_4$), or spinel lithium manganese oxide ($LiMn_2O_4$, $Li_2MnO_3$ or $LiMnO_2$). Sulfur (S) or sulfide such as lithium sulfide ($Li_2S$) may be used as the positive electrode active material. The positive electrode active material may be positive electrode active material particles coated or doped with lithium niobium oxide ($LiNbO_3$) or the like.

The electrode layer 110 may be a mixture layer formed from a mixture of the positive electrode active material and additives. Examples of the additives include solid electrolytes such as inorganic solid electrolytes, conductive auxiliaries such as acetylene black, and binders such as polyethylene oxide and polyvinylidene fluoride. When the electrode layer 110 that is a positive electrode layer contains such an additive as a solid electrolyte in a predetermined ratio, the ion conductivity of the positive electrode layer may be enhanced. From the point of view of energy density, the active material usually represents the major proportion of the electrode layer 110.

The electrode layer 110 is formed with a predetermined shape such as a rectangular shape on a principal surface of the first current collector 200. For example, the electrode layer 110 is in the form of flat sheet having a uniform thickness. The thickness of the electrode layer 110 is, for example, not less than 5 μm and not more than 300 μm, but is not limited thereto.

The counter electrode layer 120 is a second active material layer including a second active material as a counter electrode material. The counter electrode layer 120 is paired with the electrode layer 110. The counter electrode layer 120 is disposed in contact with the second current collector 300.

In Embodiment 1, the second active material contained in the counter electrode layer 120 is a negative electrode active material (a negative electrode material). For example, the negative electrode active material may be any of various materials capable of storing and releasing metal ions such as Li ions or Mg ions. Known negative electrode active materials may be used. Examples of the negative electrode active materials include carbon materials such as natural graphite, artificial graphite, graphitized carbon fibers and calcined-resin carbons, and alloy materials which are mixed with solid electrolytes. Examples of the alloy materials include lithium alloys such as LiAl, LiZn, $Li_3Bi$, $Li_3Cd$, $Li_3Sb$, $Li_4Si$, $Li_{4.4}Pb$, $Li_{4.4}Sn$, $Li_{0.17}C$ and $LiC_6$, lithium titanium oxide ($Li_4Ti_5O_{12}$), and oxides of metals (such as Zn).

The counter electrode layer 120 may be a mixture layer formed from a mixture of the negative electrode active material and additives. Examples of the additives include solid electrolytes such as inorganic solid electrolytes, conductive auxiliaries such as acetylene black, and binders such as polyethylene oxide and polyvinylidene fluoride. When the counter electrode layer 120 that is a negative electrode layer contains such an additive as a solid electrolyte in a predetermined ratio, the ion conductivity of the negative electrode layer may be enhanced. From the point of view of energy density, the active material usually represents the major proportion of the counter electrode layer 120.

The counter electrode layer 120 is formed with a predetermined shape such as a rectangular shape on a principal surface of the second current collector 300. For example, the counter electrode layer 120 is in the form of flat sheet having a uniform thickness. The thickness of the counter electrode layer 120 is, for example, not less than 5 μm and not more than 300 μm, but is not limited thereto.

The second solid electrolyte layer 130 is disposed between the electrode layer 110 and the counter electrode layer 120 and in contact with the electrode layer 110 and the counter electrode layer 120.

The second solid electrolyte layer 130 (and the first solid electrolyte layer 400 described later) may be a generally known electrolyte for batteries such as, for example, a solid electrolyte that conducts metal ions such as Li ions or Mg ions.

Examples of the inorganic solid electrolytes include sulfide solid electrolytes and oxide solid electrolytes. For example, lithium-containing sulfide may be used as the solid electrolyte. Examples of the lithium-containing sulfides include $Li_2S$—$P_2S_5$ system, $Li_2S$—$SiS_2$ system, $Li_2S$—$B_2S_3$ system, $Li_2S$—$GeS_2$ system, $Li_2S$—$SiS_2$—LiI system, $Li_2S$—$SiS_2$—$Li_3PO_4$ system, $Li_2S$—$Ge_2S_2$ system, $Li_2S$—$GeS_2$—$P_2S_5$ system and $Li_2S$—$GeS_2$—ZnS system. Lithium-containing metal oxides such as $Li_2$—$SiO_2$ and $Li_2$—$SiO_2$—$P_2O_5$ are also usable as the solid electrolytes. Examples of the solid electrolytes further include lithium-containing metal nitrides called LIPON such as $Li_{2.9}PO_{3.3}N_{0.46}$, lithium phosphate ($Li_3PO_4$), and lithium transition metal oxides such as lithium titanium oxide. These solid electrolytes may be used singly, or two or more may be used in combination.

The second solid electrolyte layer 130 and the first solid electrolyte layer 400 may contain, in addition to the solid electrolyte materials, additives, for example, binders such as polyethylene oxide and polyvinylidene fluoride.

For example, the second solid electrolyte layer 130 is in the form of flat sheet having a uniform thickness. The thickness of the second solid electrolyte layer 130 is, for example, not less than 5 μm and not more than 150 μm, but is not limited thereto.

In the present embodiment, as illustrated in FIG. 1(b), the electrode layer 110, the counter electrode layer 120 and the second solid electrolyte layer 130 which constitute the power-generating element 100 are the same as one another in size and shape in plan view. For example, the lateral sides of the electrode layer 110, the counter electrode layer 120 and the second solid electrolyte layer 130 are in the same plane.

The first current collector 200 is disposed on the side of the electrode layer 110 opposite to the counter electrode layer 120 and is electrically connected to the electrode layer 110. For example, the first current collector 200 is in direct contact with the electrode layer 110.

The first current collector 200 is a conductive member. Specifically, the first current collector 200 includes copper. For example, the first current collector 200 is a substrate based on copper (Cu). Specifically, the first current collector 200 may be a Cu-based substrate containing Cu and other metals such as Ni, Fe and Cr.

For example, the first current collector 200 is a flat sheet having a uniform thickness. As illustrated in FIG. 1(*b*), the first current collector 200 is larger than the electrode layer 110 in plan view. Specifically, in plan view, the electrode layer 110 resides in the inside of the first current collector 200. For example, the plan shape of the first current collector 200 is, although not limited to, rectangular.

The second current collector 300 is disposed on the side of the counter electrode layer 120 opposite to the electrode layer 110 and is electrically connected to the counter electrode layer 120. For example, the second current collector 300 is in direct contact with the counter electrode layer 120.

The second current collector 300 is a conductive member. Specifically, the second current collector 300 includes copper. For example, the material which forms the second current collector 300 may be the same as or different from that forming the first current collector 200.

For example, the second current collector 300 is a flat sheet having a uniform thickness. As illustrated in FIG. 1(*b*), the second current collector 300 is larger than the counter electrode layer 120 in plan view. Specifically, in plan view, the counter electrode layer 120 resides in the inside of the second current collector 300. For example, the plan shape of the second current collector 300 is, although not limited to, rectangular.

The first solid electrolyte layer 400 is disposed in contact with the lateral side of the power-generating element 100. Specifically, the first solid electrolyte layer 400 is in contact with the second solid electrolyte layer 130. Further, in Embodiment 1, the first solid electrolyte layer 400 is in contact with the respective lateral sides of the electrode layer 110 and the counter electrode layer 120 of the power-generating element 100.

In plan view, the first solid electrolyte layer 400 is adjacent to the power-generating element 100. Specifically, the first solid electrolyte layer 400 is disposed so as to enclose the entire periphery of the power-generating element 100. For example, as illustrated in FIG. 1(*b*), the plan shape of the power-generating element 100 is rectangular and the first solid electrolyte layer 400 is an open rectangle that borders on the sides of the rectangular power-generating element 100. The first solid electrolyte layer 400 is in contact with the lateral side of the power-generating element 100 over the entire periphery of the power-generating element 100. That is, for example, no gaps are present between the first solid electrolyte layer 400 and the power-generating element 100.

The first solid electrolyte layer 400 is in contact with the second current collector 300. Specifically, the first solid electrolyte layer 400 is in contact with the portion of the second current collector 300 that is free from the counter electrode layer 120.

The first copper sulfide layer 500 is disposed between the first solid electrolyte layer 400 and the first current collector 200. The plan shape and size of the first copper sulfide layer 500 are the same as those of the first solid electrolyte layer 400. Part of the first solid electrolyte layer 400 may be in contact with the first current collector 200.

As already mentioned, the first solid electrolyte layer 400 may be a generally known electrolyte for batteries. The first solid electrolyte layer 400 and the second solid electrolyte layer 130 may include the same solid electrolyte material or may be composed of different solid electrolyte materials.

For example, the first solid electrolyte layer 400 may include sulfur. For example, the first solid electrolyte layer 400 may include a sintered structure. Incidentally, the second solid electrolyte layer 130 described hereinabove also may include a sintered structure. Specifically, the solid electrolyte that is used may be a particulate material which attains high conductivity by being pressed and which increases the percentage of bonded particle interfaces when being pressed and thus can be sintered easily. Specifically, the material may be fine particles which are highly sinterable, a material having a large surface area, a material which easily increases the interfacial area when pressed, or a material with a low Young's modulus.

The sintered structure in the first solid electrolyte layer 400 or the second solid electrolyte layer 130 may represent only a portion of the layer. Whether or not the first solid electrolyte layer 400 or the second solid electrolyte layer 130 has a sintered structure may be determined by, for example, cross sectional SEM observation. Specifically, cross sectional texture observation at a magnification of about 1000 times can easily distinguish from one another a compacted structure composed of separate and individual particles, and a sintered structure in which particles have been interfacially joined to lose interfaces or to grow to larger sizes. Alternatively, the progress of sintering can be examined in a structural strength approach, for example, by measuring the micro-Vickers hardness.

The first copper sulfide layer 500 is a layer including copper sulfide. For example, the first copper sulfide layer 500 is a layer that is formed on the first current collector 200 and is based on a composition between $Cu_2S$ and $CuS$. Specifically, the first copper sulfide layer 500 is mainly $CuS$ or may be $Cu_2S$ or a mixture of $CuS$ and $Cu_2S$.

The first copper sulfide layer 500 is disposed between the first current collector 200 and the first solid electrolyte layer 400 and in contact with the first current collector 200 and the first solid electrolyte layer 400. For example, the plan shape of the first copper sulfide layer 500 is identical with that of the first solid electrolyte layer 400. For example, the first copper sulfide layer 500 is in the form of flat sheet that is uniform in thickness and is open rectangular in plan view. For example, the thickness of the first copper sulfide layer 500 is smaller than that of the electrode layer 110. For example, the thickness of the first copper sulfide layer 500 is, although not limited to, not less than 0.01 μm and not more than 5 μm.

A portion of the first copper sulfide layer 500 may spread into the first current collector 200. In this case, the interfacial adhesion between the first copper sulfide layer 500 and the first current collector 200 may be enhanced.

The first copper sulfide layer 500 that spreads into the first current collector 200 may be fabricated by, for example, using a sulfide material to form the first solid electrolyte layer 400 and performing heat treatment after the layers are stacked into the battery. The sulfur component contained in the solid electrolyte reacts with copper in the current collector to form copper sulfide, which is then diffused into the first current collector 200 and into the first solid electrolyte layer 400 and defines an extensive first copper sulfide layer. The copper sulfide layer that is formed may contain portions of the surrounding materials which react during the process of heat treatment.

The battery having the aforementioned configurations attains excellent impact resistance and high structural stability.

In general, an interlayer separation in a solid-state battery mainly starts from the outer periphery of the cell and spreads towards the power-generating element, thereby frequently deteriorating battery characteristics. Thus, the adhesion in the outer periphery is very critical in increasing the practical reliability, for example, in enhancing impact resistance or thermal shock resistance. In particular, in view of the fact that solid-state batteries are frequently manufactured by a powder compacting process, the effectiveness of one aspect of the present disclosure in enhancing the adhesion in batteries is highly taken advantage of by such a type of batteries.

During the manufacturing process, in general, a solid electrolyte exclusively unlike other materials is compacted and sintered to an advanced level to form a microstructure that is strong compared to an electrode layer and a counter electrode layer. In contrast, a positive electrode active material layer and a negative electrode active material layer, which in the present embodiment are the electrode layer 110 and the counter electrode layer 120, maintain the compacted state of the matrix particles and thus differ in structural stability from the sintered solid electrolyte layer. Because of this, after the formation of the first copper sulfide layer 500, the bond strength with respect to the first current collector 200 is more effectively ensured at the interface between the first solid electrolyte layer 400 which has a sintered structure, and the first current collector 200 than at the interface between the electrode layer 110 which is prone to disintegration of particles, and the first current collector 200.

The region where the first copper sulfide layer 500 is disposed, that is, the region outside the power-generating element 100 has less influence on battery characteristics. It is therefore possible to control the thickness, concentration or state of the first copper sulfide layer 500 in a wide range so that sufficient adhesion will be ensured.

As described above, the first copper sulfide layer 500 disposed on the outside of the power-generating element 100 acts to bond strongly and closely the first current collector 200 and the first solid electrolyte layer 400 to each other. This configuration makes it possible to suppress the occurrence of an interlayer separation which starts from the outer periphery of the battery 1000 and advances to the power-generating element 100. Thus, for example, the battery exhibits superior impact resistance and high reliability with little occurrence of structural defects during the manufacturing process or actual use of the battery. The battery 1000 is prevented from interlayer separation as a result of the aforementioned actions and effects, and thus attains excellent impact resistance and high reliability.

If there is not the first copper sulfide layer 500, the joining of the first current collector 200 and the first solid electrolyte layer 400 relies only on the anchoring effect that works between them. Thus, separations occur easily after the stacking process or during the assembling steps, and the battery will be unstable to temperature and impact during actual use. A possible approach to this problem is, for example, to tightly constrain the solid-state battery. However, the constraint mechanism disadvantageously adds an extra size to the battery and also destabilizes battery characteristics. Such destabilization of characteristics probably mainly stems from insufficient structural stability of the battery. Because the battery 1000 according to the present embodiment requires no constraint mechanisms and has high structural stability by itself, the battery 1000 of the present embodiment is useful for the problems discussed here.

While details will be described in Embodiment 2 later, enhanced adhesion may be attained by forming a second copper sulfide layer 600 between the electrode layer 110 and the first current collector 200. This approach is useful for batteries having low-rate, for example 0.05 C, charge discharge characteristics.

However, because the second copper sulfide layer 600 adds resistance to the power-generating element 100, deteriorations in characteristics are more significant with increasing magnitude of power, for example, 1 C or higher rate.

The prime feature of the present embodiment resides in that the adhesion with respect to the first current collector 200 is enhanced by forming a copper sulfide layer along the interface between the current collector 200 and the first solid electrolyte layer 400 having a sintered and stable structure while avoiding the interface between the current collector 200 and the electrode layer 110 having a brittle compacted powder structure. In the compacting process for fabricating a solid-state battery, a solid electrolyte is usually used which can be sintered to an advanced level under pressurization applied during the fabrication process to attain high conductivity. The first current collector 200 and the first solid electrolyte layer 400 having such a tightly sintered structure are joined together through an interface between the first solid electrolyte layer 400 and the first copper sulfide layer 500. In this manner, they are bonded to each other more strongly and attain high adhesion. This high-adhesion region is located along the outer periphery of the power-generating element 100, and consequently the battery 1000 can achieve superior impact resistance and other characteristics without suffering deteriorations in battery characteristics.

As discussed above, the configurations according to the present embodiment can offer an enhancement in interlayer adhesion in the stack structure without adversely affecting high-rate battery characteristics. Thus, batteries with high reliability can be provided.

Embodiment 2

Hereinbelow, Embodiment 2 will be described mainly focusing on the differences from Embodiment 1 discussed above. The description of features which are common to Embodiment 1 will be omitted or simplified appropriately.

Figure 2:
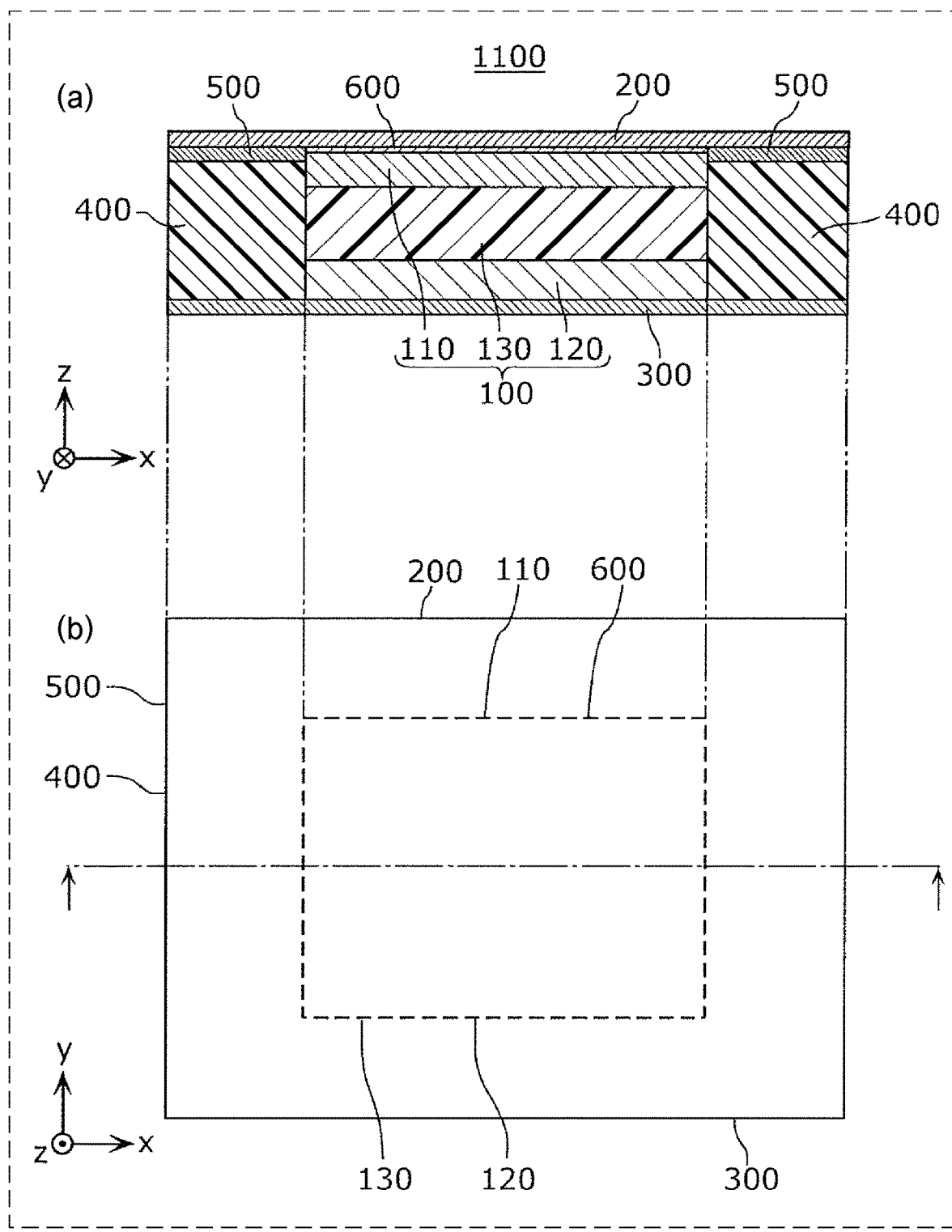
FIG. 2 is a view illustrating a schematic configuration of a battery of Embodiment 2.

FIG. 2 is a view illustrating a schematic configuration of a battery 1100 according to Embodiment 2. Specifically, FIG. 2(a) is a sectional view of the battery 1100, and illustrates the cross section along the dot-and-dash line in FIG. 2(b). FIG. 2(b) is a top perspective view of the battery 1100. In FIG. 2(b), the plan shapes of constituent elements of the battery 1100 seen from above are shown with actual lines or broken lines.

As illustrated in FIG. 2, the battery 1100 of Embodiment 2 includes a second copper sulfide layer 600 in addition to the configuration of the battery 1000 of Embodiment 1.

The second copper sulfide layer 600 is a layer including copper sulfide. For example, the material which forms the second copper sulfide layer 600 may be the same as or different from that forming the first copper sulfide layer 500. For example, the second copper sulfide layer 600 is a layer based on a composition between $Cu_2S$ and $CuS$. The second copper sulfide layer 600 may have the same composition as the first copper sulfide layer 500.

The second copper sulfide layer 600 is disposed between the first current collector 200 and the electrode layer 110 and in contact with the first current collector 200 and the electrode layer 110. For example, the plan shape of the second copper sulfide layer 600 is identical with that of the electrode layer 110. For example, the second copper sulfide layer 600 is in the form of flat sheet that is uniform in thickness and is rectangular in plan view. The thickness of the second copper sulfide layer 600 is smaller than that of the first copper sulfide layer 500. For example, the thickness of the second copper sulfide layer 600 is, although not limited to, not less than 0.01 μm and not more than 5 μm.

A portion of the second copper sulfide layer 600 may spread into the first current collector 200. In this case, the interfacial adhesion between the second copper sulfide layer 600 and the first current collector 200 may be enhanced.

Incidentally, a copper sulfide layer disposed between a current collector and a positive electrode active material layer or a negative electrode active material layer, which in the present embodiment is the electrode layer 110 or the counter electrode layer 120, is unsatisfactory in terms of impact resistance and adhesion, and requires further improvements. This poor adhesion probably stems from the fact that the positive electrode active material layer or the negative electrode active material layer is based on a compacted powder structure and the particles are disintegrated easily.

To address this problem, the second copper sulfide layer 600 in the present embodiment borders on the first copper sulfide layer 500. That is, the first copper sulfide layer 500 and the second copper sulfide layer 600 continuously cover the principal surface of the first current collector 200. For example, the entirety of the principal surface of the first current collector 200 is covered by the first copper sulfide layer 500 and the second copper sulfide layer 600.

According to the above configuration, the copper sulfide layers continuously interface with the sintered first solid electrolyte layer 400 and the electrode layer 110. This extension complementarily enhances the impact resistance of the interface region in the compacted powder structure that is prone to disintegration. Because the second copper sulfide layer 600 is a good conductor with low resistance, the influence of the second copper sulfide layer 600 on low-rate charge discharge characteristics is substantially negligible. Thus, the battery 1100 for low-rate use which has the above configurations can attain enhanced impact resistance.

In the present embodiment, the electrode layer 110 may include sulfur. In this case, the adhesion between the second copper sulfide layer 600 and the electrode layer 110 may be increased.

Embodiment 3

Hereinbelow, Embodiment 3 will be described mainly focusing on the differences from Embodiment 1 or 2 discussed above. The description of features which are common to Embodiment 1 or 2 will be omitted or simplified appropriately.

Figure 3:
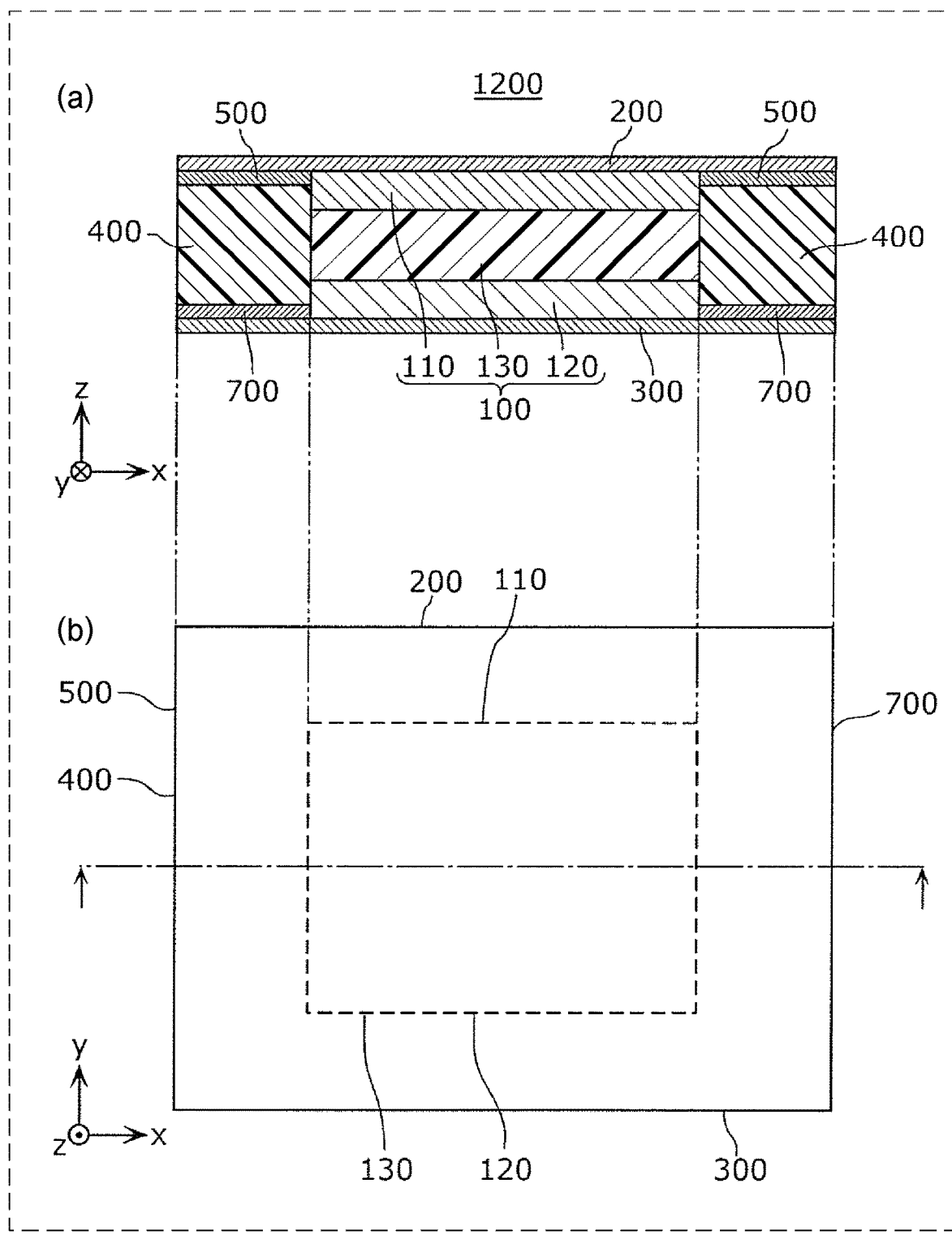
FIG. 3 is a view illustrating a schematic configuration of a battery of Embodiment 3.

FIG. 3 is a view illustrating a schematic configuration of a battery 1200 according to Embodiment 3. Specifically, FIG. 3(a) is a sectional view of the battery 1200, and illustrates the cross section along the dot-and-dash line in FIG. 3(b). FIG. 3(b) is a top perspective view of the battery 1200. In FIG. 3(b), the plan shapes of constituent elements of the battery 1200 seen from above are shown with actual lines or broken lines.

As illustrated in FIG. 3, the battery 1200 of Embodiment 3 includes a third copper sulfide layer 700 in addition to the configuration of the battery 1000 of Embodiment 1.

The third copper sulfide layer 700 is a layer including copper sulfide. For example, the material which forms the third copper sulfide layer 700 may be the same as or different from that forming the first copper sulfide layer 500. For example, the third copper sulfide layer 700 is a layer based on a composition between $Cu_2S$ and $CuS$. The third copper sulfide layer 700 may have the same composition as the first copper sulfide layer 500.

The third copper sulfide layer 700 is disposed between the second current collector 300 and the first solid electrolyte layer 400 and in contact with the second current collector 300 and the first solid electrolyte layer 400. For example, the plan shape of the third copper sulfide layer 700 is identical with that of the first solid electrolyte layer 400 or the first copper sulfide layer 500. For example, the third copper sulfide layer 700 is in the form of flat sheet that is uniform in thickness and is open rectangular in plan view. For example, the thickness of the third copper sulfide layer 700 is, although not limited to, not less than 0.01 μm and not more than 5 μm.

A portion of the third copper sulfide layer 700 may spread into the second current collector 300. In this case, the interfacial adhesion between the third copper sulfide layer 700 and the second current collector 300 may be enhanced.

The battery 1200 having the above configurations attains higher impact resistance and higher structural stability.

Specifically, the third copper sulfide layer 700 serves to strongly and closely bond the second current collector 300 and the first solid electrolyte layer 400 to each other and thereby prevents an interlayer separation which occurs at the outer periphery of the battery 1200 and spreads towards the power-generating element 100. For example, the battery exhibits superior impact resistance and high reliability with little occurrence of structural defects during the manufacturing process or actual use of the battery.

In the present embodiment, the first solid electrolyte layer 400 is bonded with high adhesion to each of the first current collector 200 and the second current collector 300. Thus, according to the present embodiment, the interlayer adhesion in the stack structure can be enhanced without adversely affecting high-rate battery characteristics. Thus, batteries with high reliability can be provided.

Embodiment 4

Hereinbelow, Embodiment 4 will be described mainly focusing on the differences from any of Embodiments 1 to 3 discussed above. The description of features which are common to any of Embodiments 1 to 3 will be omitted or simplified appropriately.

Figure 4:
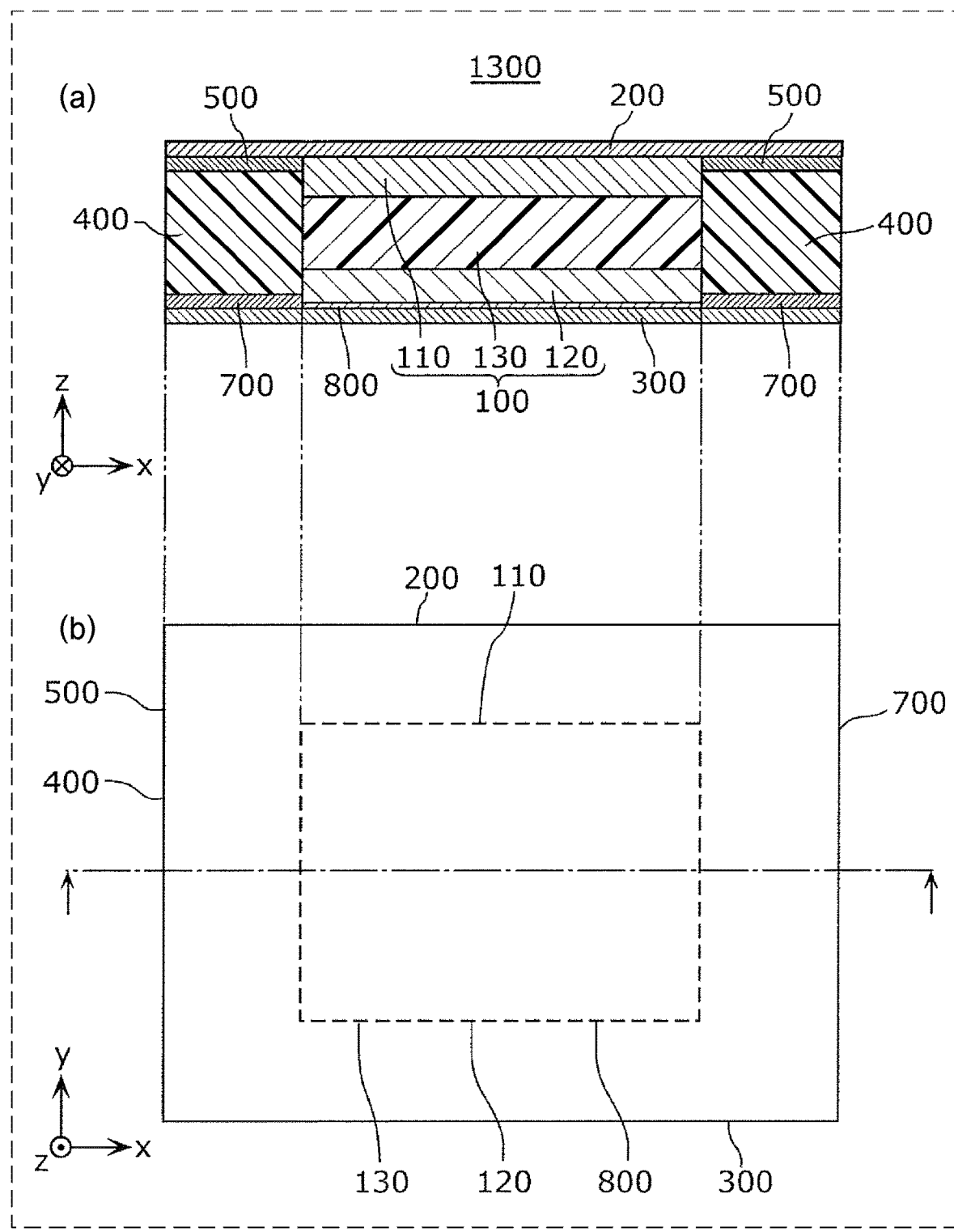
FIG. 4 is a view illustrating a schematic configuration of a battery of Embodiment 4.

FIG. 4 is a view illustrating a schematic configuration of a battery 1300 according to Embodiment 4. Specifically, FIG. 4(a) is a sectional view of the battery 1300, and illustrates the cross section along the dot-and-dash line in FIG. 4(b). FIG. 4(b) is a top perspective view of the battery 1300. In FIG. 4(b), the plan shapes of constituent elements of the battery 1300 seen from above are shown with actual lines or broken lines.

As illustrated in FIG. 4, the battery 1300 of Embodiment 4 includes a fourth copper sulfide layer 800 in addition to the configuration of the battery 1200 of Embodiment 3.

The fourth copper sulfide layer 800 is a layer including copper sulfide. The material which forms the fourth copper sulfide layer 800 may be the same as or different from that forming the first copper sulfide layer 500. For example, the fourth copper sulfide layer 800 is a layer based on a composition between $Cu_2S$ and $CuS$. The fourth copper sulfide layer 800 may have the same composition as the first copper sulfide layer 500.

The fourth copper sulfide layer 800 is disposed between the second current collector 300 and the counter electrode layer 120 and in contact with the second current collector 300 and the counter electrode layer 120. For example, the plan shape of the fourth copper sulfide layer 800 is identical with that of the counter electrode layer 120. For example, the fourth copper sulfide layer 800 is in the form of flat sheet that is uniform in thickness and is rectangular in plan view. The thickness of the fourth copper sulfide layer 800 is smaller than that of the third copper sulfide layer 700. For example, the thickness of the fourth copper sulfide layer 800 is, although not limited to, not less than 0.01 µm and not more than 5 µm.

A portion of the fourth copper sulfide layer 800 may spread into the second current collector 300. In this case, the interfacial adhesion between the fourth copper sulfide layer 800 and the second current collector 300 may be enhanced.

In the present embodiment, the fourth copper sulfide layer 800 borders on the third copper sulfide layer 700. That is, the third copper sulfide layer 700 and the fourth copper sulfide layer 800 continuously cover the principal surface of the second current collector 300. For example, the entirety of the principal surface of the second current collector 300 is covered by the third copper sulfide layer 700 and the fourth copper sulfide layer 800.

According to the above configuration, the copper sulfide layers continuously interface with the sintered first solid electrolyte layer 400 and the counter electrode layer 120. This extension complementarily enhances the impact resistance of the interface region in the compacted powder structure that is prone to disintegration. Because the fourth copper sulfide layer 800 is a good conductor with low resistance, the influence of the fourth copper sulfide layer 800 on low-rate charge discharge characteristics is substantially negligible. Thus, the battery 1300 for low-rate use which has the above configurations can attain still enhanced impact resistance.

In the present embodiment, the counter electrode layer 120 may include sulfur. In this case, the adhesion between the fourth copper sulfide layer 800 and the counter electrode layer 120 may be increased.

Embodiment 5

Hereinbelow, Embodiment 5 will be described mainly focusing on the differences from any of Embodiments 1 to 4 discussed above. The description of features which are common to any of Embodiments 1 to 4 will be omitted or simplified appropriately.

Figure 5:
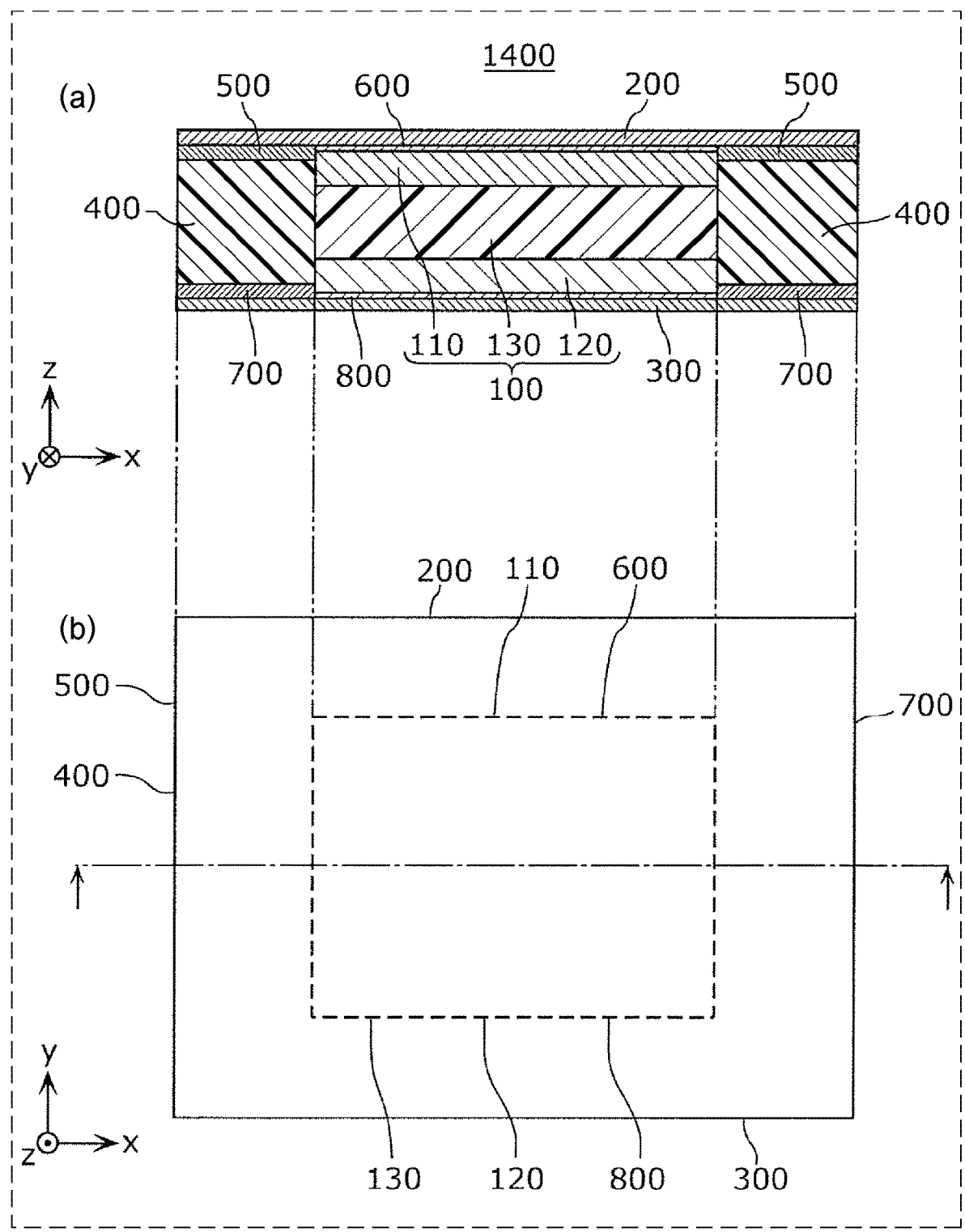
FIG. 5 is a view illustrating a schematic configuration of a battery of Embodiment 5.

FIG. 5 is a view illustrating a schematic configuration of a battery 1400 according to Embodiment 5. Specifically, FIG. 5(a) is a sectional view of the battery 1400, and illustrates the cross section along the dot-and-dash line in FIG. 5(b). FIG. 5(b) is a top perspective view of the battery 1400. In FIG. 5(b), the plan shapes of constituent elements of the battery 1400 seen from above are shown with actual lines or broken lines.

As illustrated in FIG. 5, the battery 1400 of the present embodiment includes all of a first copper sulfide layer 500, a second copper sulfide layer 600, a third copper sulfide layer 700 and a fourth copper sulfide layer 800.

The battery 1400 having the above configuration attains still enhanced impact resistance and higher structural stability. As is the case herein, the configurations described in Embodiments 1 to 4 may be appropriately combined.

[Battery Production Methods]

Hereinbelow, an example method for producing the batteries of Embodiments 1 to 4 will be illustrated.

First, pastes are prepared which will be used to print a first active material layer as an electrode layer 110, a second active material layer as a counter electrode layer 120, and a first solid electrolyte layer 400. The solid electrolyte raw material used as a component in the mixture for forming the electrode layer 110 and the counter electrode layer 120 may be $Li_2S$—$P_2S_5$ sulfide glass powder which is based on triclinic crystal and has an average particle size of about 10 µm and which, when compacted, has high ion conductivity (for example, not less than $2 \times 10^{-3}$ S/cm and not more than $3 \times 10^{-3}$ S/cm).

The solid electrolyte paste for forming the first solid electrolyte layer 400 and the second solid electrolyte layer 130 is prepared by mixing the above-described glass powder with an organic binder and a solvent to form a dispersion. For example, the positive electrode active material may be a powder of layered Li.Ni.Co.Al composite oxide ($LiNi_{0.8}Co_{0.15}Al_{0.05}O_2$) with an average particle size of about 5 µm. In the similar manner as described above, the first active material layer paste is prepared which will form a positive electrode layer including a mixture of the positive electrode active material and the above-described glass powder. The negative electrode active material may be a powder of natural graphite with an average particle size of about 10 µm. In the similar manner as described above, the second active material layer paste is prepared which will form a negative electrode layer including a mixture of the negative electrode active material and the above-described glass powder.

Next, copper foils having a thickness of, for example, about 30 µm are provided for use as a positive electrode current collector and a negative electrode current collector. The positive electrode layer paste and the negative electrode layer paste are screen printed onto one side of the respective copper foils with predetermined shapes and thicknesses of about 50 µm to 100 µm. The pastes printed with such thicknesses will be 30 µm to 60 µm thick after being dried at a temperature of not less than 80° C. and not more than 130° C. In this manner, current collectors (copper foils) are obtained which have a print serving as a positive electrode layer (specifically, the electrode layer 110) and a print serving as a negative electrode layer (specifically, the counter electrode layer 120), respectively. That is, the above process results in a first current collector 200 having the electrode layer 110, and a second current collector 300 having the counter electrode layer 120.

Next, the solid electrolyte paste is printed, with a thickness of about 100 µm, onto the surface of the print as the positive electrode layer and the surface of the print as the negative electrode layer through a metal mask. The solid electrolyte paste is applied onto the electrode layer 110 and the region of the first current collector 200 exposed from the electrode layer 110. Similarly, the solid electrolyte paste is applied onto the counter electrode layer 120 and the region of the second current collector 300 exposed from the counter electrode layer 120. The paste is then dried at a temperature of not less than 80° C. and not more than 130° C.

Next, a paste for forming a thermal expansion resin layer is printed, with predetermined shapes and thicknesses of about 100 µm to 150 µm, onto the regions except the solid electrolyte prints through a metal mask. The paste printed with such thicknesses will be 80 µm to 120 µm thick after being dried at a temperature of not less than 80° C. and not more than 130° C. The thicknesses are selected to be substantially equal to the thicknesses of the solid electrolyte prints on the positive electrode layer side and the negative electrode layer side.

Next, the current collectors are stacked one on top of the other so that the solid electrolyte layer on the positive electrode layer side and the solid electrolyte layer on the negative electrode layer side are opposed to each other. The stack is then placed into a die which is rectangular in outline. Next, an elastic sheet (70 µm thick) with an elastic modulus of about 5×10$^6$ Pa is inserted between the stack and a press mold punch. Thereafter, the stack is pressurized at a pressure of 500 MPa for 300 seconds while increasing the temperature to 150° C. A battery 1400 is thus obtained.

A first copper sulfide layer 500, a second copper sulfide layer 600, a third copper sulfide layer 700 and a fourth copper sulfide layer 800 are formed through precipitation during this pressurization and heating process. These copper sulfide layers are precipitated in accordance with the sulfur component concentration of the material in contact with the current collector. Thus, the copper sulfide layer will be precipitated with a larger thickness and a higher concentration at the interface of the solid electrolyte layer than at the interface of the electrode layer or the counter electrode layer which contains the solid electrolyte as one of the components of the electrode mixture. That is, the thicknesses of the first copper sulfide layer 500 and the third copper sulfide layer 700 are larger than the thicknesses of the second copper sulfide layer 600 and the fourth copper sulfide layer 800.

The formation of copper sulfide may be controlled by controlling the sulfur content in the solid electrolyte layer or controlling the temperature and the amount of time in the stacking process. For example, it is possible to prevent the third copper sulfide layer 700 from forming by controlling the sulfur concentration in the solid electrolyte layer on the side adjacent to the second current collector 300 to a sufficiently low level. Further, it is possible to prevent the second copper sulfide layer 600 from forming by controlling the sulfur concentration in the electrode layer 110 to a sufficiently low level. Furthermore, it is possible to prevent the fourth copper sulfide layer 800 from forming by controlling the sulfur concentration in the counter electrode layer 120 to a sufficiently low level.

Other Embodiments

While the batteries according to one or more aspects have been illustrated above based on some embodiments, the scope of the present disclosure is not limited to such embodiments and includes various alterations of the above embodiments which are conceivable for the skilled person, and embodiments which result from combinations of constituent elements belonging to different embodiments, without departing from the spirit of the present disclosure.

For example, in the embodiments described above, the electrode layer 110 may be the negative electrode, and the counter electrode layer 120 may be the positive electrode of the battery. That is, the first current collector 200 may be the negative electrode current collector, and the second current collector 300 may be the positive electrode current collector.

For example, the first solid electrolyte layer 400 and the second solid electrolyte layer 130 may be each free from sulfur. The first solid electrolyte layer 400 and the second solid electrolyte layer 130 may each contain no sintered structure.

For example, the electrode layer 110 and the counter electrode layer 120 may be each free from sulfur.

For example, the first copper sulfide layer 500 and the second copper sulfide layer 600 may have an identical thickness. The third copper sulfide layer 700 and the fourth copper sulfide layer 800 may have an identical thickness.

Further, for example, the first solid electrolyte layer 400 and the second solid electrolyte layer 130 may be each composed of a plurality of separate layers. Specifically, the first solid electrolyte layer 400 may include an electrode-side solid electrolyte layer disposed on the electrode layer 110 side, and a counter electrode-side solid electrolyte layer disposed on the counter electrode layer 120 side. Similarly, the second solid electrolyte layer 130 may include an electrode-side solid electrolyte layer disposed on the electrode layer 110 side, and a counter electrode-side solid electrolyte layer disposed on the counter electrode layer 120 side. The electrode-side solid electrolyte layer and the counter electrode-side solid electrolyte layer may be composed of the same or different materials.

The end portions of the first current collector 200, that is, the lateral side of the first current collector 200 may be covered with copper sulfide. The end portions of the second current collector 300, that is, the lateral side of the second current collector 300 may be covered with copper sulfide.

Various modifications such as alterations, replacements, additions and omissions can be made to the embodiments described hereinabove within the scope defined by the appended claims and equivalents thereof.

What is claimed is:

1. A battery comprising:
   a unit cell including an electrode layer and a counter electrode layer facing the electrode layer,
   a first current collector disposed on a side of the electrode layer opposite to the counter electrode layer and electrically connected to the electrode layer,
   a first solid electrolyte layer disposed in contact with a lateral side of the unit cell,
   a first copper sulfide layer containing copper sulfide, and
   a second copper sulfide layer containing copper sulfide, wherein
   the first current collector contains copper,
   the first copper sulfide layer is disposed between the first current collector and the first solid electrolyte layer and in contact with the first current collector and the first solid electrolyte layer,
   the second copper sulfide layer is disposed between the first current collector and the electrode layer and in contact with the first current collector and the electrode layer, and
   a thickness of the first copper sulfide layer is larger than a thickness of the second copper sulfide layer.

2. The battery according to claim 1, wherein the first solid electrolyte layer contains sulfur.

3. The battery according to claim 1, wherein the first solid electrolyte layer includes a sintered structure.

4. The battery according to claim 1, wherein
   the unit cell further includes a second solid electrolyte layer between the electrode layer and the counter electrode layer, and
   the first solid electrolyte layer is in contact with the second solid electrolyte layer.

5. The battery according to claim 4, wherein
the first solid electrolyte layer and the second solid electrolyte layer contain a same solid electrolyte material.

6. The battery according to claim 1, wherein
the electrode layer contains sulfur.

7. The battery according to claim 1, further comprising:
a second current collector disposed on a side of the counter electrode layer opposite to the electrode layer and electrically connected to the counter electrode layer, and
a third copper sulfide layer containing copper sulfide, wherein
the second current collector contains copper, and
the third copper sulfide layer is disposed between the second current collector and the first solid electrolyte layer and in contact with the second current collector and the first solid electrolyte layer.

8. The battery according to claim 7, further comprising a fourth copper sulfide layer containing copper sulfide, wherein
the fourth copper sulfide layer is disposed between the second current collector and the counter electrode layer and in contact with the second current collector and the counter electrode layer.

9. The battery according to claim 8, wherein
the counter electrode layer contains sulfur.

10. The battery according to claim 8, wherein
a thickness of the third copper sulfide layer is larger than a thickness of the fourth copper sulfide layer.

* * * * *